Figure 1:
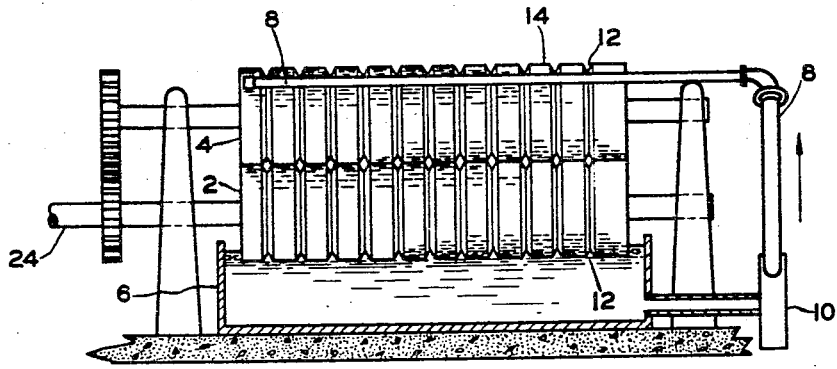

March 12, 1957 E. A. ROBINSON 2,785,083
CELLULOSIC SHEET COATED WITH A DESICCATED RIDGED
FILM OF ADHESIVE SODIUM SILICATE
Original Filed July 24, 1948

Inventor
EDWARD A. ROBINSON
By
Attorney

United States Patent Office 2,785,083
Patented Mar. 12, 1957

2,785,083

CELLULOSIC SHEET COATED WITH A DESICCATED RIDGED FILM OF ADHESIVE SODIUM SILICATE

Edward A. Robinson, South Euclid, Ohio, assignor to Diamond Alkali Company, Cleveland, Ohio, a corporation of Delaware Original application July 24, 1948, Serial No. 40,524. Divided and this application June 27, 1952, Serial No. 295,873

2 Claims. (Cl. 117—44)

This invention relates to a method for applying an adhesive to sheet material and more particularly relates to a method for applying adhesive to articles and especially to a method for applying an aqueous solution of a soluble silicate glass to a core ply of a laminated article.

This application is a division of my copending application, Ser. No. 40,524, filed July 24, 1948, now abandoned.

It has heretofore been proposed in the art of laminating cellulosic materials to apply aqueous solutions of soluble silicate glasses to a core sheet from substantially smooth surfaced rolls, with the result that only a thin film of substantially uniform thickness of the adhesive glass is deposited upon the core sheet. Thereafter, when facing members are brought into contact with the thus-coated core member for the purpose of establishing a bond between the core member and the facing members, such contact must be made almost immediately after applying the silicate adhesive in order to prevent atmospheric drying of the adhesive material and consequent loss of the effectiveness of the bonding material.

In certain laminated articles of commerce, such as packing case shooks, the necessity of this rapid succession of applying the silicate adhesive to a core ply and substantially immediately bringing the facing plies into contact therewith to establish the bond, has heretofore precluded the use of adhesives of aqueous solutions of silicate glasses unmodified by other substances. Thus, in the customary methods for preparing such articles as packing case shooks, the holding time required for accumulating a suitable number of the laminated assemblies, prior to cold pressing to establish the bond between the core and facing plies, allows the silicate bonding material to become dried because of the combined action of the acid constituents in the woody material and ambient atmospheric conditions. The bond therefore is effective only in limited areas between the plies, a condition known in the art as "starved joints."

This condition of starved joints has been alleviated to some extent by certain of the prior art methods involving the more expensive procedure of modifying the soluble silicate glass adhesives by incorporating therewith such substances as starch, casein, soya protein, and inorganic materials, such as lime, to obtain a slower drying, less fluid, adhesive. The starch and protein-modified silicate adhesives, in addition to their greater original cost, further increase the cost of manufacture of laminated cellulosic articles because of the extended cold pressing time required to establish the bond. Thus, in a starch-modified silicate glass used in the manufacture of packing case shooks, the cold pressing time is customarily upwards of sixteen hours at a pressure of seventy-five to one hundred pounds per square inch. In addition to the raw material cost and extended cold pressing time, this prior art procedure of employing modifying substances in the adhesive silicate glasses entails added expense of storing and handling and necessity of combining the ingredients prior to use. The cost of raw materials, compounding and mixing, and prolonged cold pressing, taken together, are a decided disadvantage economically in the manufacture of multiple ply articles, such as packing case shooks.

In contrast to the prior art methods, the method of the present invention is directed to the use of aqueous solutions of silicate glasses without further modification by the addition of other substances. The adhesive silicate glass solutions used herein are those commercially available and are applied, according to the method of the present invention, to surfaces of material to be bonded, such as sheets of cellulosic material, in a manner to be more fully described and set forth hereinafter, which permits the customary stacking of a number of laminated assemblies consisting of a core ply, together with facing plies, prior to cold pressing. The manner in which the soluble silicate glasses are applied to surfaces of cellulosic materials to be bonded causes a sufficient amount of liquid silicate adhesive to be retained within the laminated assemblies to insure a uniform spreading of the adhesive material during the cold pressing step; consequently, commercially satisfactory bonding of the facing plies to the core ply without the presence of starved joints in the final product is obtained. In addition, a lower cost adhesive is used in the method of the present invention and at substantially the same "spread" (weight of silicate adhesive per unit area treated) as that employed in the prior art modified starch adhesives and hence, a definite economic advantage obtains therefrom. It is also to be particularly noted in connection with the method that no new process steps, in addition to those of the conventional bonding methods, are necessitated by the present invention and that the time required for cold pressing the assemblies is substantially less than that required for modified silicate glass adhesives.

The method of the present invention for preparing an adhesive surface for sheet material, especially cellulosic sheet materials, includes the steps of depositing a continuous film of an adhesive aqueous solution of a soluble silicate glass upon the surface of a sheet of such material, while simultaneously depositing thereon regularly spaced ridges of said solution of greater thickness than said film and subsequently desiccating the exposed surfaces of said ridges and said film.

A particularly advantageous application of the present invention arises in the manufacture of plywood and the like, wherein by treating one or both sides of a ply in accordance herewith and subsequently applying one to two non-adhesive plies thereto with sufficient pressure to rupture said ridges, a superior bond is obtained and an assembly may be fabricated by cheaper and better means than has heretofore been known in the art.

In practicing the method of the present invention, it is preferred that the composition of the silicate glass adhesive used therein be such that the ratio of sodium oxide to silicon oxide be greater than 1:3.5 and less than 1:3. Where the ratio of sodium oxide to silicon oxide is less than 1:3.5, i. e., where the amount of $SiO_2$ is substantially greater than 3.5 moles per mole of $Na_2O$, the aqueous silicate glass solutions within the preferred range of concentration are very viscous at low temperatures, such as are encountered in cold climates. Furthermore, and of greater significance, because of the lesser amount of $Na_2O$ present, the soluble glasses having a ratio of $Na_2O$ to $SiO_2$ substantially less than 1:3.5, must be employed at lower concentrations of their solutions to obtain a suitable viscosity of the adhesive solution and hence, there will necessarily be present a greater proportion of water which must be evaporated and absorbed from the bond by the cellulosic material in order that the said bond may not be defective.

Where the ratio of sodium oxide to silicon oxide is greater than 1:3, i. e., where the amount of $SiO_2$ is substantially less than 3 moles per mole of $Na_2O$, the adhesive properties of such solution are not as good as those within the preferred range and hence, operational difficulties will be multiplied and the strength of the bond in the final product adversely affected. In addition, a solution of a silicate glass having a ratio of $Na_2O$ to $SiO_2$ greater than 1:3, and a suitable viscosity for bonding wood veneers, will necessarily have a greater degree of alkalinity than a solution of a glass having a lower ratio and hence the bond obtained by the use of such solutions will be more subject to failure under humid conditions. Hence, while silicate glass solutions having a ratio of $Na_2O$ to $SiO_2$ outside the preferred range may be used, it is preferred, for the reasons given above, i. e., temperature sensitivity, operational difficulties, and inferior bond, that the ratio of $Na_2O$ to $SiO_2$ be kept substantially within the range of 1:3 to 1:3.5.

The preferred concentration of the soluble alkali silicate glasses having the preferred range of ratios of sodium oxide to silicon oxide lies within the range of 35% to 40%. Where this preferred concentration of the silicate glasses is used, it has been found that there is less temperature sensitivity of the solutions with respect to viscosity and that an optimum amount of water is evaporated therefrom, consistent with good adhesive properties, to effect the proper bonding of sheets of cellulosic material.

Figure 2:
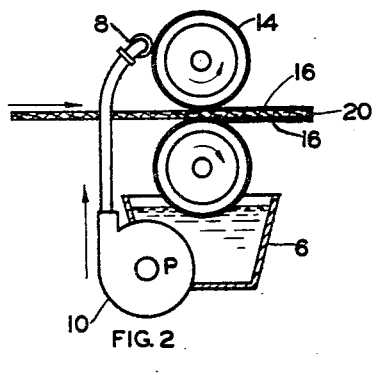
Figure 3:
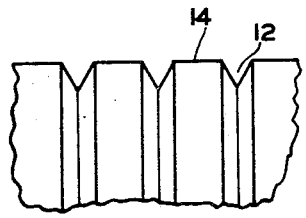
Figure 4:
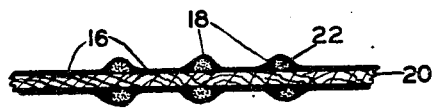
Figure 5:
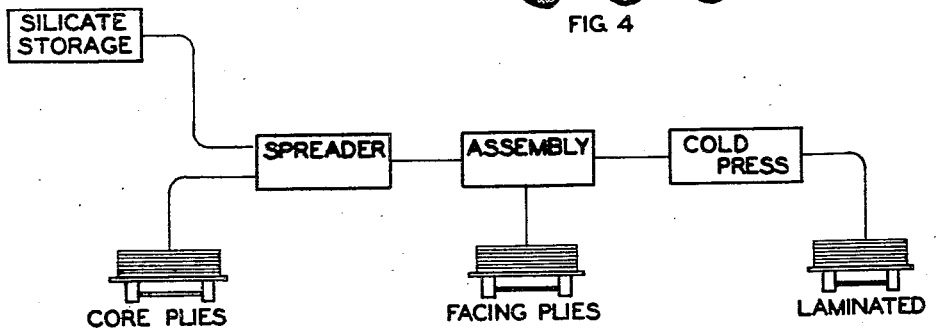

The method of the present invention may be more fully set forth by describing the same as practiced on a preferred apparatus, shown on the drawing forming a part hereof in which, Fig. 1 is a front elevation of an apparatus suitable for practicing the method of the present invention, Fig. 2 is an end elevation, the roll supports being omitted for clarity, Fig. 3 is an enlarged elevation of a roll, parts thereof being broken away, Fig. 4 is a transverse vertical section through a ply, coated according to the method of the present invention, parts being exaggerated for clarity, and Fig. 5 is a flow-sheet of a process for making plural-ply packing case shooks.

Referring now to the drawings, the process as practiced with a particular apparatus will be described in detail, whereby those skilled in the art may better understand the method of the present invention and in what manner the same may be carried into effect.

The tank 6 is filled to approximately the level shown with an aqueous silicate glass of suitable concentration, for example, a solution having a solids content of about 40%, the solids having a ratio of $Na_2O$ to $SiO_2$ of 1:3–3.5, specifically 1:3.2. The shaft 24 is rotated by power supplied from any suitable source to cause the rollers 2 and 4 to rotate at a suitable speed, for example, about 50 to 60 R. P. M., and simultaneously therewith a portion of the silicate glass solution is pumped from tank 6 by means of pump 10 through line 8, and thus against the upper roll 4 through suitable openings in line 8 (not shown). Roll 2 is positioned in tank 6 so that the portion of the surface roll 2 subsequently coming in contact with ply 20 is beneath the surface of the solutions of silicate glass. Thus, the rotation of the roll 2 and the solution direction from line 8 against roll 4 fills the grooves 12 of both rolls and coats the flat portions 14 thereof with the adhesive solution. The pressure on the rolls 2 and 4 is adjusted to give the desired spread of adhesive consistent with the nature of the wood or other material to be bonded, and the depth of the grooves 12 of the rolls 2 and 4. In one embodiment of the method of the present invention, a spread of about 75 pounds of adhesive solution per 1,000 square feet is obtained by cutting the grooves to a depth of $\frac{1}{16}$ inch and a maximum width at the roll periphery of $\frac{3}{16}$ inch, the grooves being spaced about ½ inch apart, and adjusting the pressure at the roll bite to about 15 pounds. A ply 20 is fed into the bite of the rolls 2 and 4 and emerges therefrom coated with the adhesive solution as shown particularly in desiccated form in Fig. 4. Thus, there is deposited upon the surface of ply 20, filmed areas 16, and ridges 18, of solution. The filmed areas 16, and the surfaces of the ridges 18, dry rapidly under proper atmospheric conditions with the result that areas 16 are sized with dried silicate adhesive material and the liquid cores 22 of ridges 18 are protected from further evaporation of water therefrom.

Where the so-treated ply is to be employed as a core ply of the three-ply laminate, the preferred procedure is as follows:

The core ply 20 is placed between two facing plies from the pile indicated in Fig. 5 and the assembly thus formed placed with previously similarly prepared assemblies also indicated in Fig. 5; the rate of application of the adhesive silicate glass solution at the spreader is preferably adjusted to the rate of assembling the laminated bodies so that a stack of several assemblies is made up within the space of several minutes, for example, 7 to 10 minutes, under ordinary conditions of temperature and humidity, for example, a temperature of about 32° to 35° C. and a relative humidity of about 65% to 70%, in order to secure the optimum bonding of the facing plies with the core plies in the cold pressing operation. The further stacking of assemblies gradually increases the pressure upon the lower members of the pile, which pressure exerted upon the dried surfaces of the ridges 18 may cause rupture thereof with the result that the liquid 22 in the cores of the ridges 18 flows outwardly therefrom to cover the dried sized filmed area 16. When a suitable number of assemblies has been accumulated, the stack is placed between the platens of a press indicated in Fig. 5 and the stack of assemblies subjected to sufficient pressure to insure rupture of all of the ridges 18 of the pile and for a suitable time to establish the desired bond, for example, a stack of assemblies is subjected to a pressure of the order of 100 pounds per square inch for a period of about 2 hours, whereby the dried surfaces of the ridges 18 are certainly ruptured, causing the spreading of liquid adhesive on the sized areas 16 and consequent tight bonding between the plies. No heating is required in the pressing operation; in fact, the use of heated platens in the pressing operation may have a detrimental effect upon the bond.

In the manufacture of packing case plywood hereinabove described, the core ply sheet 20, to which the adhesive glass solution is applied, may be a single continuous sheet of wood veneer or it may be scrap pieces of veneer obtained in the course of cutting veneer sheets from a dried, and debarked, log or from subsequent trimming operations, wherein large sheets of the veneer material are trimmed down to the size desired in the final laminated product.

In addition, the rolls 2 and 4 may be of any suitable materail which is not subject to chemical attack by the soluble silicate glasses under the conditions of operation. However, it has been found preferable in the practice of the present invention to employ rubber-covered steel rolls, since such rolls combine the properties of chemical inertness to the silicate glasses with a desirable degree of resiliency, which causes less damage to the porous cellulosic materials, and insures good traction of the rolls upon the surfaces of the cellulosic material.

It will be appreciated that in accordance with the present method, the sheet material treated by applying thereto a thin film of silicate with spaced ridges of solution thereon will be sized by the thin film of silicate, whereby upon the subsequent dessication of the sized film and the surfaces of the ridges, and following that, a rupture of the ridges to permit the still liquid solution to flow over the sized areas, no undue absorption of the material from the ridges will occur through the already sized surfaces, whereby rather than the adhesive material being dissipated in filling the pores of the sheet material, it will remain substantially on the surface and serve as a true adhesive connection between the sheet material and other sheet material applied thereto. This, it will be appreciated, comprises a considerable advantage over prior art procedures, where the adhesive material applied to a ply had to serve both as a sizing agent and an adhesive agent for another ply placed thereover.

It will further be appreciated that while the method of the invention is optionally practiced upon the apparatus shown in Figs. 1 through 3, other apparatus may be used and, in fact, if desired, the method may be practiced by hand by applying to a sheet surface, a sizing coat and a series of spaced ridges of silicate of soda and dessicating only the surface areas of the ridges and sized portion, while leaving the interiors of the ridges still in liquid form.

The method of the present invention has been herein described particularly for the manufacture of cellulosic packing case shooks, but it will be appreciated by those skilled in the art that, with slight modifications, it would be advantageously applied to other materials. For example, in laminating various grades of paperboard and the like, the acidic constituents of natural woods may be simulated by impregnating the paper with suitable acidic inorganic chemicals, such as heavy metal salts of strong acids, or slightly acidic substances of organic character, such as natural wood extracts containing tannins, or naphthenic acids or the like, in order to accelerate the drying of the filmed areas between the ridges of silicate solution, as well as to aid in securing a bond of better than average strength.

While there have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. As an article of manufacture, a cellulosic sheet having deposited thereon alternately spaced areas of desiccated films of adhesive silicate of soda solution unmodified by other substances, and deposited ridges of said silicate of soda, the concentration of said silicate of soda in said solution being within the range of 35%–40%, and having an $Na_2O:SiO_2$ molar ratio of 1:3–3.5, the surfaces of said ridges being desiccated and the interior of said ridges being liquid.

2. An article as claimed in claim 1 in which both sides of said sheet are so treated.

References Cited in the file of this patent
UNITED STATES PATENTS

| | | |
|---|---|---|
| 337,155 | Heston | Mar. 2, 1886 |
| 1,041,287 | Hoskins | Oct. 15, 1912 |
| 1,863,707 | Wood | June 21, 1932 |
| 2,054,448 | Russell | Sept. 15, 1936 |
| 2,178,566 | Dike | Nov. 7, 1939 |
| 2,282,177 | Dike | May 5, 1942 |
| 2,434,466 | Marc | Jan. 13, 1948 |